US008336528B2

(12) United States Patent
Hori et al.

(10) Patent No.: US 8,336,528 B2
(45) Date of Patent: Dec. 25, 2012

(54) EGR DEVICE

(75) Inventors: Ryoichi Hori, Kita-ku (JP); Satoshi Kimura, Kita-ku (JP); Satoshi Tamagawa, Kita-ku (JP)

(73) Assignee: Calsonic Kansei Corporation, Saitama-ken (JP)

( * ) Notice: Subject to any disclaimer, the term of this patent is extended or adjusted under 35 U.S.C. 154(b) by 865 days.

(21) Appl. No.: 12/309,182

(22) PCT Filed: Jun. 28, 2007

(86) PCT No.: PCT/JP2007/062972
§ 371 (c)(1),
(2), (4) Date: Apr. 13, 2009

(87) PCT Pub. No.: WO2008/007561
PCT Pub. Date: Jan. 17, 2008

(65) Prior Publication Data
US 2009/0314266 A1    Dec. 24, 2009

(30) Foreign Application Priority Data

Jul. 10, 2006  (JP) ................................. 2006-189739
Oct. 18, 2006  (JP) ................................ 2006-283191

(51) Int. Cl.
*F02M 25/07*  (2006.01)
*F02B 47/08*  (2006.01)
*F02B 33/44*  (2006.01)
*F02B 29/04*  (2006.01)
*F01P 1/06*   (2006.01)

(52) U.S. Cl. ................ 123/568.12; 123/41.31; 123/563; 60/599; 60/605.2

(58) Field of Classification Search ............... 123/41.31, 123/41.33, 563, 568.12; 165/41, 51, 172, 165/173; 60/599, 605.2
See application file for complete search history.

(56) References Cited

U.S. PATENT DOCUMENTS

| 5,690,082 A * | 11/1997 | Tanioka et al. ......... 123/568.12 |
| 2003/0234008 A1* | 12/2003 | Van Winkle .................. 123/563 |
| 2005/0034712 A1* | 2/2005 | Guerrero ....................... 123/540 |
| 2006/0185626 A1* | 8/2006 | Allen et al. ................ 123/41.31 |
| 2008/0202725 A1* | 8/2008 | Kardos et al. ............ 123/568.12 |

FOREIGN PATENT DOCUMENTS

| JP | 2003-278608 | 10/2003 |
| JP | 2004-132180 | 4/2004 |
| JP | 2005-517857 | 6/2005 |
| JP | 2006-125375 | 5/2006 |
| JP | 2006-132469 | 5/2006 |

OTHER PUBLICATIONS

International Search Report issued Jul. 24, 2007 in International Application No. PCT/JP2007/062972.

* cited by examiner

*Primary Examiner* — Willis R Wolfe, Jr.
(74) *Attorney, Agent, or Firm* — Wenderoth, Lind & Ponack, L.L.P.

(57) ABSTRACT

An EGR device includes a first cooling passage that introduces a flowing medium discharged from an engine into a main radiator so that the flowing medium is cooled therein, and then returns the flowing medium to the engine, and a second cooling passage that introduces a part of the flowing medium cooled in the first cooling passage to a sub-radiator so that the flowing medium is further cooled therein. The second cooling passage introduces the flowing medium to an EGR cooler to return the flowing medium, which is discharged from the EGR cooler, to the engine.

4 Claims, 8 Drawing Sheets

(a)

(b)

(a)

(b)

PRIOR ART

PRIOR ART

EGR DEVICE

BACKGROUND OF THE INVENTION

I. Technical Field

The present invention relates to an EGR device that recirculates a part of exhaust gas discharged from an engine to an air intake side of the engine.

II. Description of the Related Art

In the engines of the motor vehicles, conventional technology of exhaust gas reciculation (EGR) devices is disclosed in Japanese Patent Applications Laid-Open Publication No. 2004-132180 and No. 2003-278608, in which the devices decrease the generation of nitrogen oxide (NOx) by lowering the combustion temperature due to the suppression of fuel combustion in the engine.

In such conventional EGR devices, as shown in FIG. 7, a part of the exhaust gas is introduced from an engine 02 to an EGR cooler 05 through an exhaust manifold 08, and a part of the rest of the exhaust gas discharged from the EGR cooler 05 is introduced into an intake manifold 08c, which is connected with an intake pipe 08a, through a compressor 03a of a turbocharger 03a and an intercooler 04.

Incidentally, the EGR cooler 05 introduces a part of flowing medium that circulates between the engine 02 and a radiator 06, and it decreases the temperature of the exhaust gas due to heat exchange between the exhaust gas and the flowing medium, similarly to devices of the above Japanese patent applications.

In recent years, the radiators are demanded to have higher cooling performances mainly according to the increase of engine outputs. In order to achieve this demand, the larger radiators might be employed, but it has a limit to increase core sizes of the radiators, allowing for its installation space, its weight, its manufacturing costs and others. Consequently, as shown in FIG. 8, a main radiator 06a and a sub-radiator 06b are arranged in a front and back direction thereof to be connected with each other in parallel to each other, or the main radiator 06a and the sub-radiator 06b are arranged in the front and back direction to be connected with each other in series.

SUMMARY OF THE INVENTION

The conventional EGR devices, however, have a problem in that the temperature of the flowing medium becomes relatively high, so that the EGR cooler cannot cool the exhaust gas sufficiently when the radiator is connected with the sub-radiator in parallel to each other as shown in FIG. 8. On the other hand, they have another problem in that an entire amount of the flowing medium of the radiator is needed to flow to the sub-radiator even at a low engine load range, consequently large amounts thereof are wasted, when the radiator is connected with the sub-radiator in series as shown in FIG. 9.

Incidentally, in a case where a cooling passage of the radiator and a cooling passage of the EGR cooler are completely separated from each other, pumps, pipes and others that are used for recirculating the flowing medium are respectively needed for the two passages, thereby its manufacturing costs significantly rises.

The present invention is made in order to solve the above-described problems, and its object is to provide an EGR device that can achieve a need for high cooling performance of a radiator, being able to cool an exhaust gas flowing through an EGR cooler without a need for introducing all amount of a flowing medium of the radiator even at a low engine load.

According to a first aspect of the present invention there is provided an EGR device that includes a first cooling passage, a second cooling passage and a flow regulating means, where the first cooling passage introduces a flowing medium that is discharged from an engine into a main radiator so that the flowing medium is cooled therein and then returns the flowing medium to the engine, while the second cooling passage introduces a part of the flowing medium that is cooled in the first cooling passage to a sub-radiator so that the flowing medium is further cooled therein. The second cooling passage introduces the flowing medium to an EGR cooler to return the flowing medium, which is discharged from the EGR cooler, to the engine. The flow regulating means is capable of regulating a flow amount of the flowing medium that is cooled in the first cooling passage so as to be introduced into the sub-radiator. The main radiator and the sub-radiator are combined to form a radiator having a tank as one unit, and an inner space of the tank of the radiator is separately divided by a partition plate that is provided with a communicating hole therein to form the tank of the main radiator and the tank of the sub-radiator. The flow regulating means has a piston type orifice valve including a piston that has an orifice for obtaining a certain opening area relative to an area of the communicating hole of the partition plate, the piston being able to open and close the orifice, and a driving means that drives the piston.

The EGR device of the present invention includes the first cooling passage and the second cooling passage, where the first cooling passage introduces the flowing medium that is discharged from the engine into the main radiator so that the flowing medium is cooled therein and then returns the flowing medium to the engine, while the second cooling passage introduces the part of the flowing medium cooled in the first cooling passage to the sub-radiator so that the flowing medium is further cooled therein. The second cooling passage introduces the flowing medium to the EGR cooler to return the flowing medium, which is discharged from the EGR cooler, to the engine. Therefore, the EGR device of the present invention can achieve the need for the high cooling performance of the radiator, cooling an exhaust gas that flows through the EGR cooler. In addition, the main radiator and the sub-radiator can be constructed in compact. Furthermore, the flow regulating means can be constructed in a simple structure, providing precise control and improving flow resistance and component reliability.

BRIEF DESCRIPTION OF THE DRAWINGS

The objects, features and advantages of the present invention will become apparent as the description proceeds when taken in conjunction with the accompanying drawings, in which:

FIG. 4(a) is a view showing the completely close state of the flow regulating valve, and FIG. 4(b) is a view showing the full open state of the flow regulating valve;

DETAILED DESCRIPTION OF THE INVENTION

Figure 1:
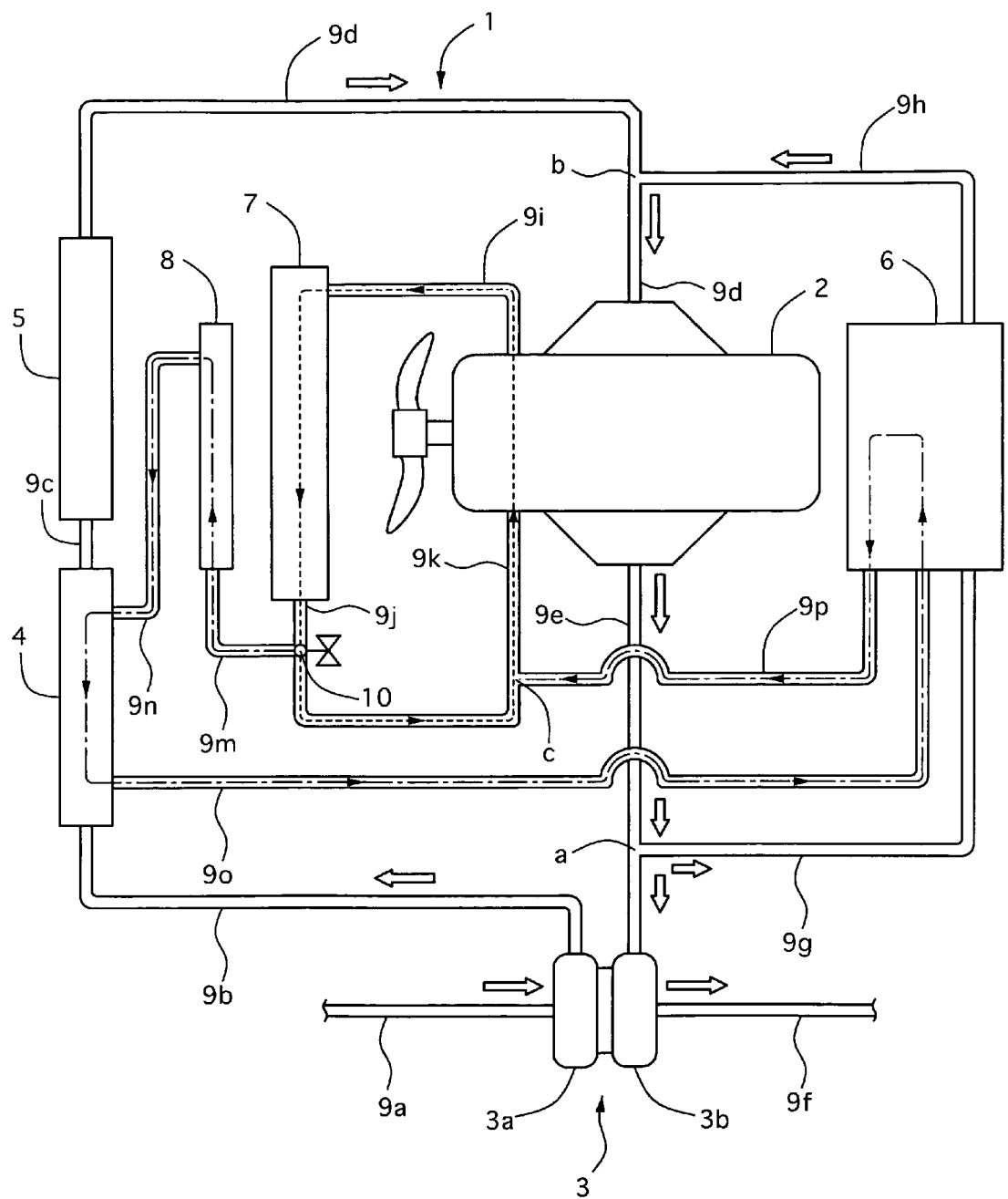
FIG. 1 is a diagram showing a system of an EGR device of a first preferred embodiment according to the present invention.

Throughout the following detailed description, similar reference characters and numbers refer to similar elements in all figures of the drawings, and their descriptions are omitted for eliminating duplication.

Hereinafter, a first embodiment will be described with reference to the accompanying drawings.

First Embodiment

Figure 2:
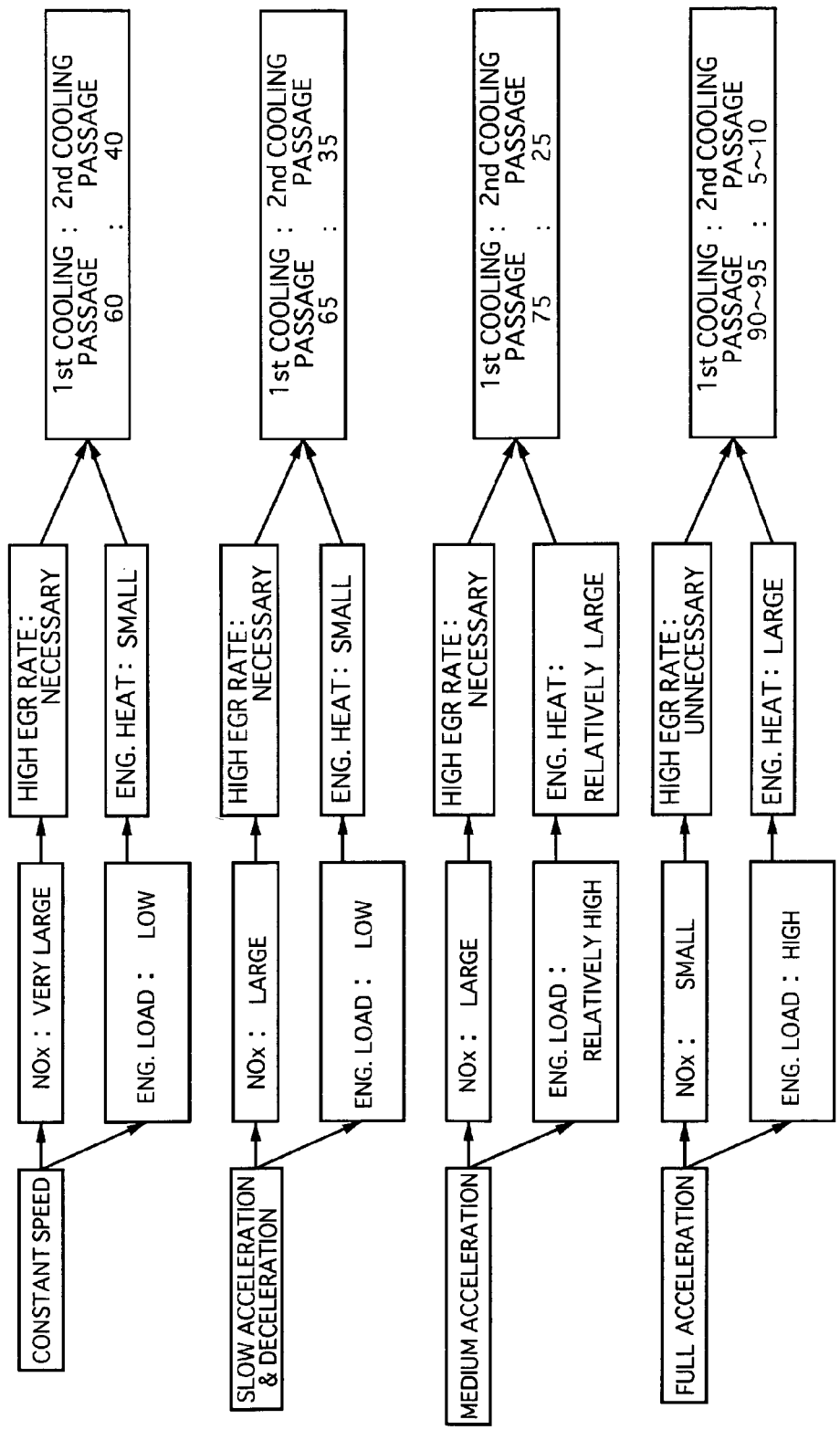
FIG. 2 is a diagram illustrating control logic executed by the EGR device of the first embodiment.
Figure 3:
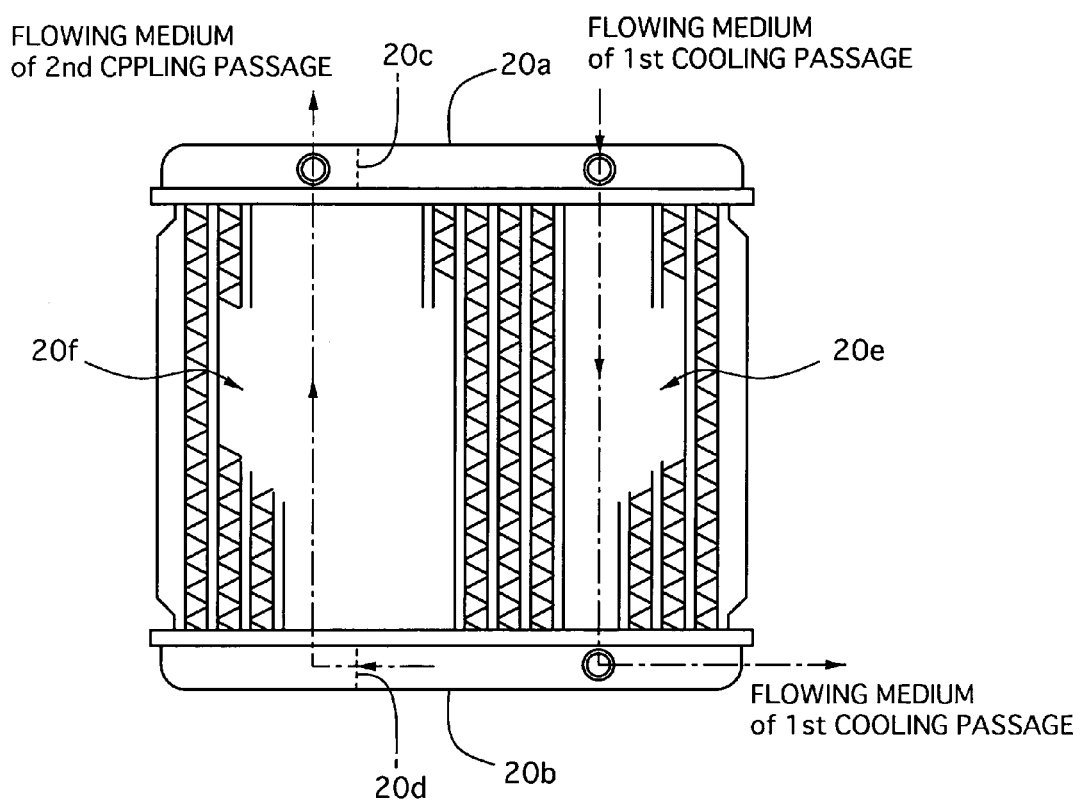
FIG. 3 is a view showing an example of a radiator where a main radiator and a sub-radiator are constructed as one unit.
Figure 4:
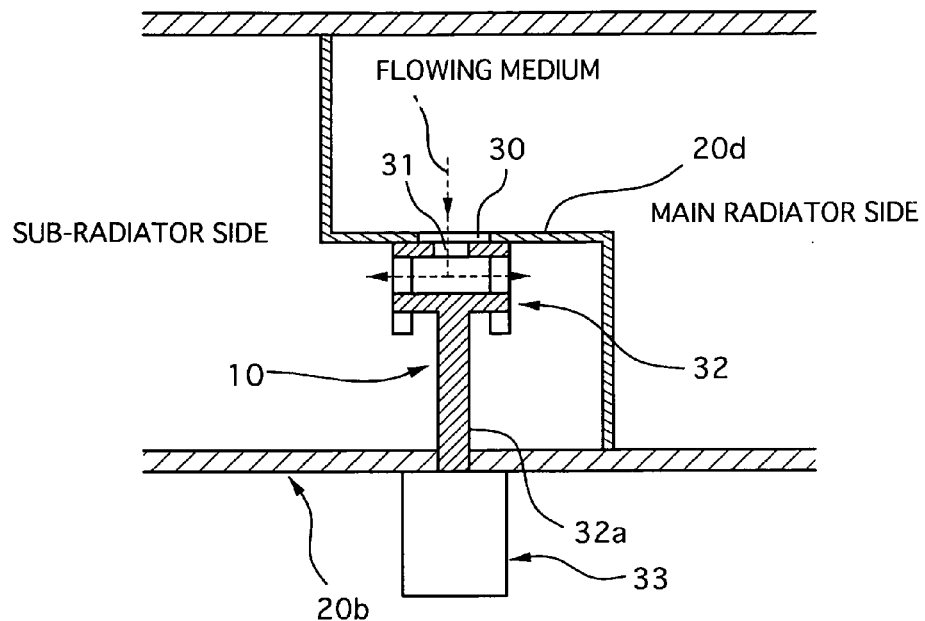
FIG. 4 is a cross sectional view showing a flow regulating valve in an open/close state and an interior of a tank in the example of the radiator where the main radiator and the sub-radiator are constructed as one unit.
Figure 4:
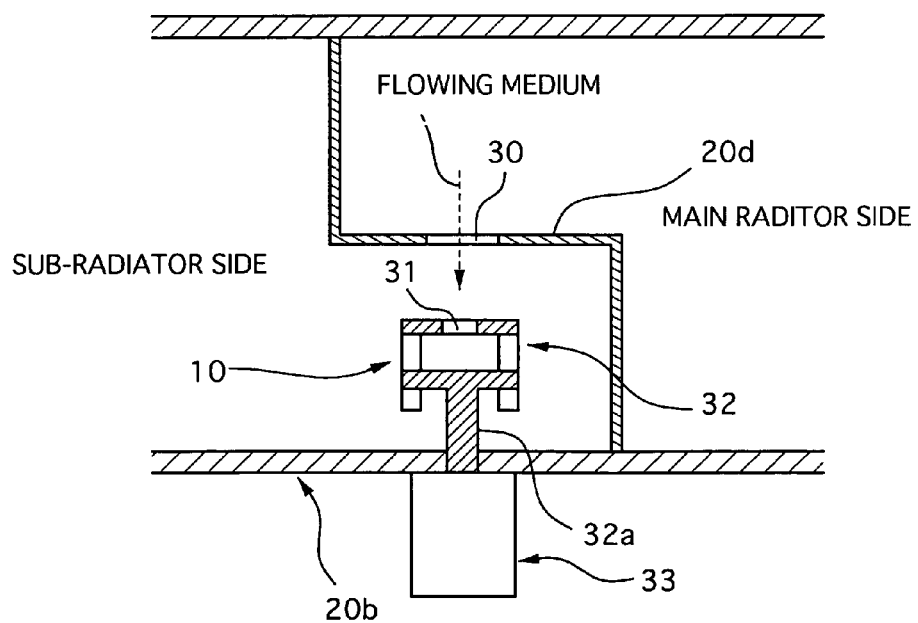
Figure 5:
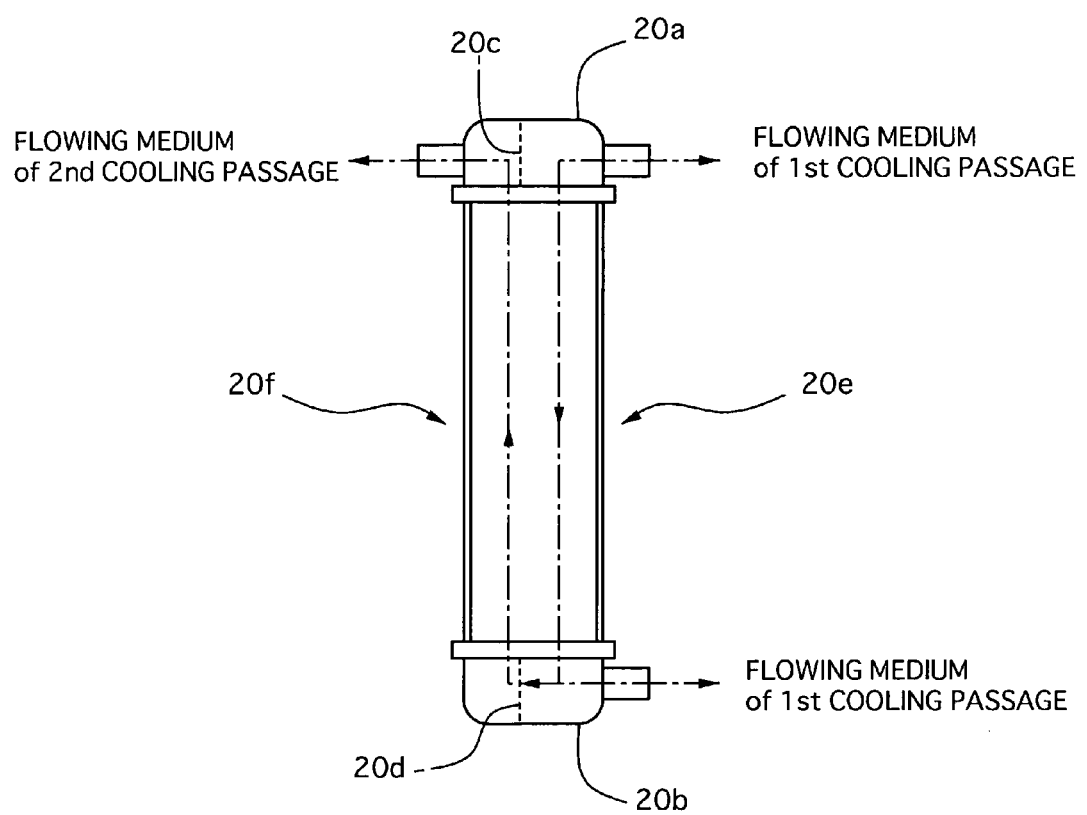
FIG. 5 is a view illustrating another example of a radiator where a main radiator and a sub-radiator are constructed as one unit.
Figure 6:
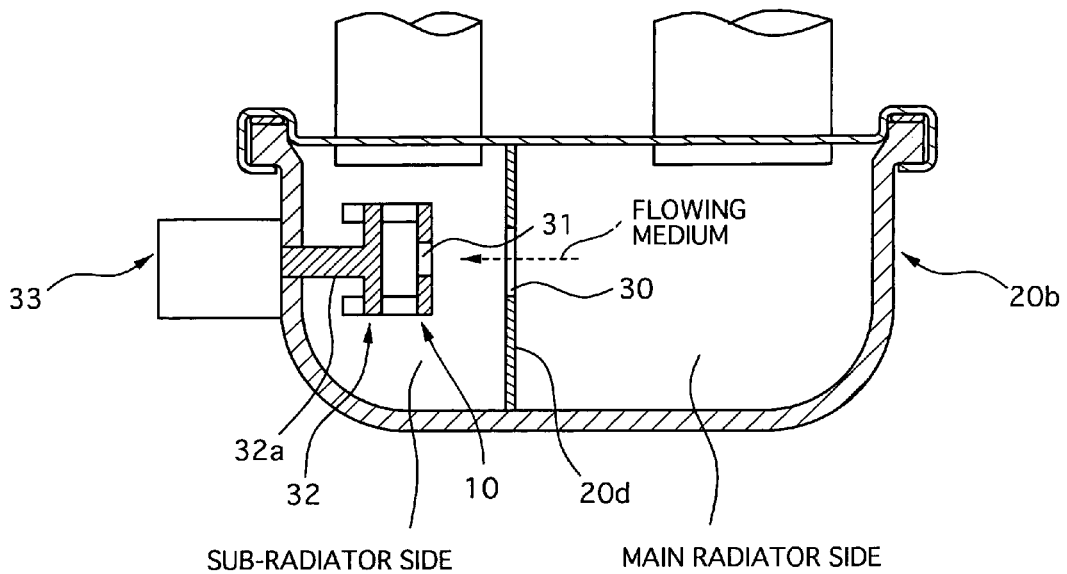
FIG. 6 is a cross sectional view showing a flow regulating valve in an open/close state and an interior of a tank in the example of the radiator shown in FIG. 5 where the main radiator and the sub-radiator are constructed as one unit, FIG. 6(*a*) is a view showing the completely close state of the flow regulating valve, and FIG. 6(*b*) is a view showing the full open state of the flow regulating valve.
Figure 6:
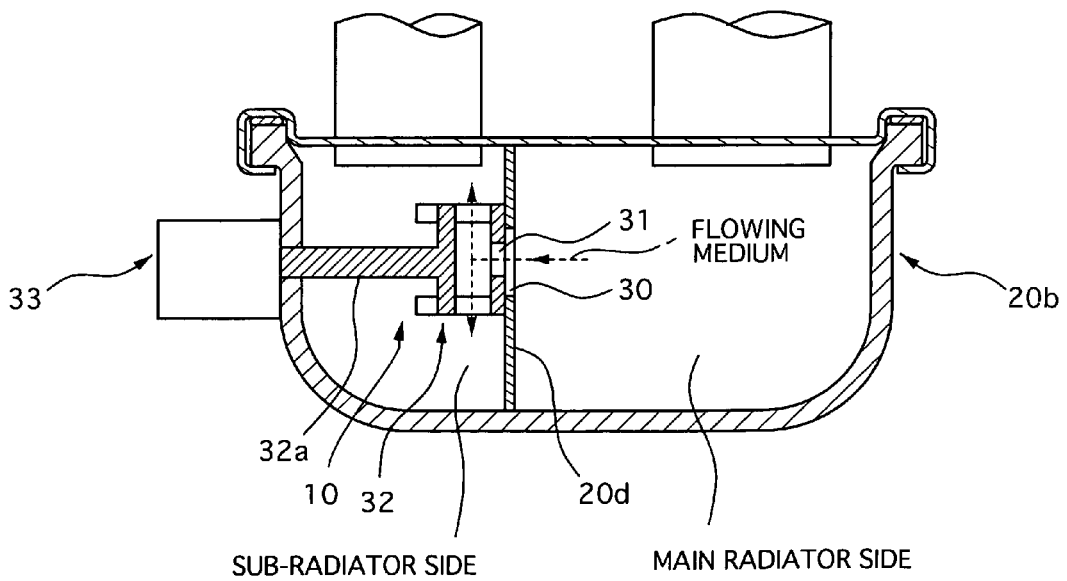
Figure 7:
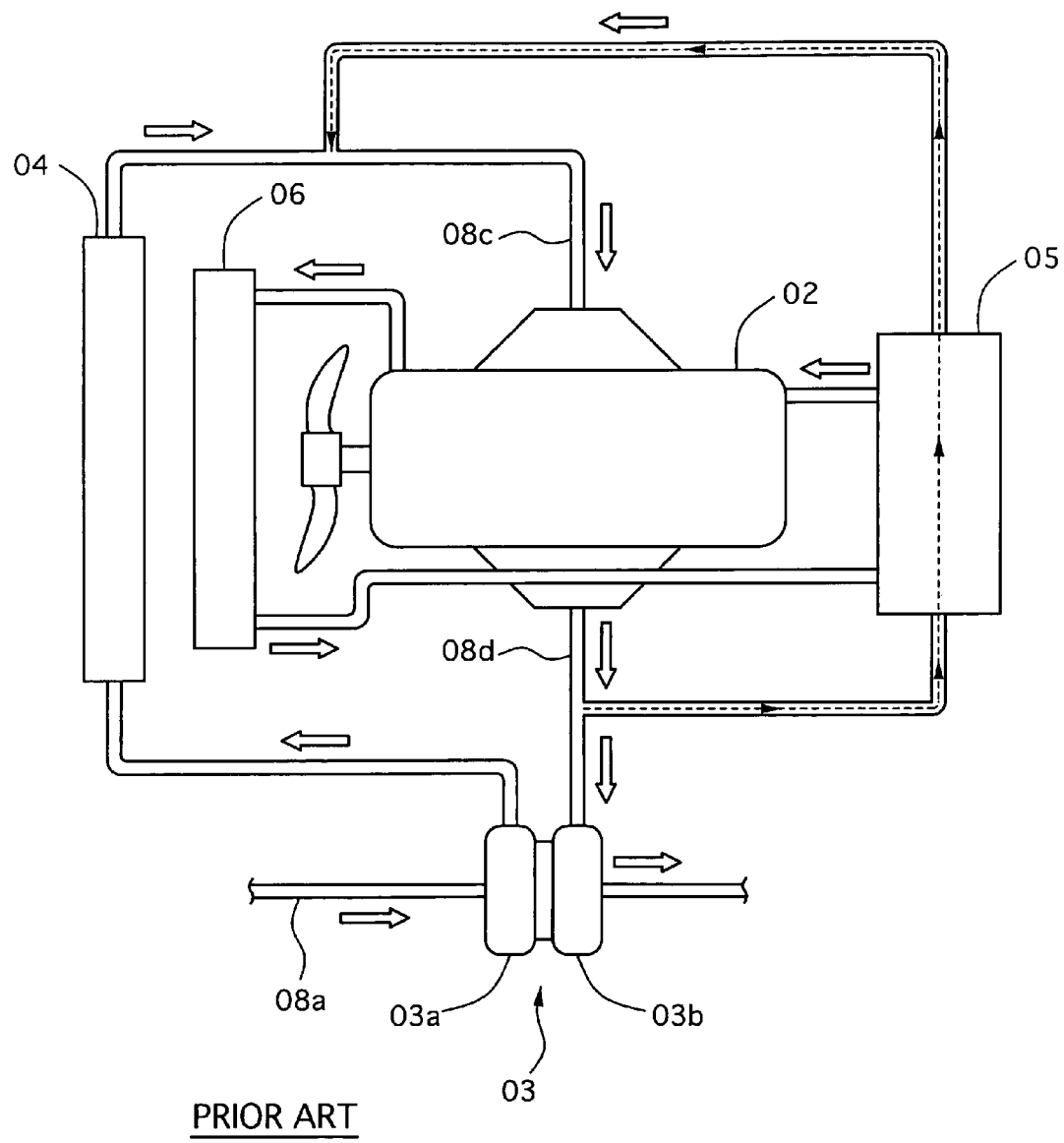
FIG. 7 is a diagram showing a system of a conventional EGR device.
Figure 8:
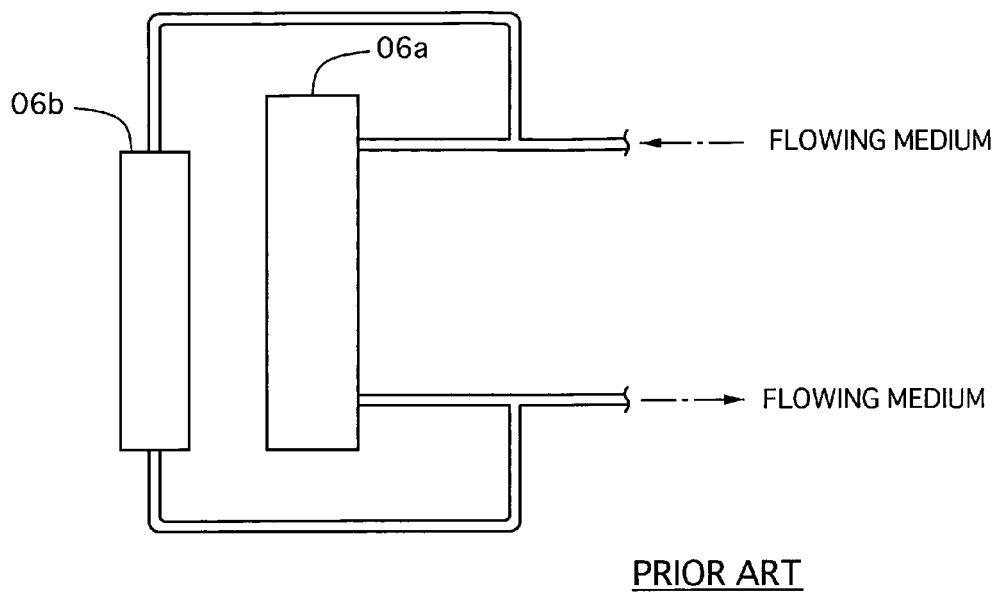
FIG. 8 is a diagram illustrating a conventional example where a main radiator and a sub-radiator are connected in parallel to each other.
Figure 9:
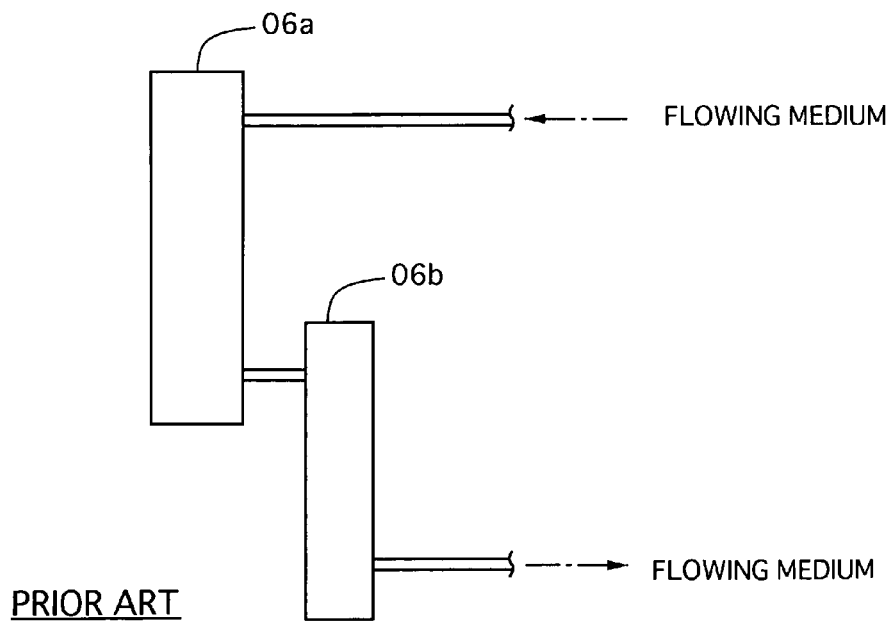
FIG. 9 is a diagram illustrating the other conventional example where the main radiator and the sub-radiator are connected in series.

FIG. 1 is a diagram showing a system of an EGR device of a first embodiment according to the present invention, FIG. 2 is a diagram showing control logic executed by the EGR device of the first embodiment, FIG. 3 is a view showing an example of a radiator where a main radiator and a sub-radiator are constructed as one unit, FIG. 4 is a view showing an interior of a tank of the radiator and a flow regulating valve thereof in a completely close state of as shown in (a) and in a full open state thereof as shown in (b), FIG. 5 is a view showing another example of a radiator where a main radiator and a sub-radiator are constructed as one unit, and FIG. 6 is a view showing an interior of a tank of the radiator shown in FIG. 5 and a flow regulating valve thereof in a completely close state of as shown in (a) and in a full open state thereof as shown in (b).

First, the entire construction of the EGR device of the first embodiment will be described.

As shown in FIG. 1, the EGR device 1 of the first embodiment includes an engine as a diesel engine 2, a turbocharger 3, a water cooled intercooler 4, an air cooled intercooler 5, an EGR cooler 6, a main radiator 7 and a sub-radiator 8.

An intake air is introduced through a not-shown air cleaner, then is introduced into a compressor 3*a* of the turbocharger 3*a* through an intake pipe 9*a* so as to be compressed by the compressor 3*a*. Then it is further introduced to the water cooled intercooler 4 and the air cooled intercooler 5 in these order through connecting pipes 9*b* and 9*c* to be cooled therein, successively being distributed to each cylinders, not shown, of the engine 2 through the intake manifold 9*d*.

In addition, an exhaust gas that is discharged from the engine 2 is introduced to a turbine 3*b* of the turbocharger 3 through an exhaust manifold 9*e*, then being discharged to an exterior of a motor vehicle through an exhaust pipe 9*f*.

A part of the exhaust gas is introduced to the EGR cooler 6 through a bifurcation portion "a" of the exhaust manifold 9*e* and a connecting pipe 9*g* to be cooled therein, and then it flows through a connecting pipe 9*h* to join together with an intake air at a confluent portion "b" of the intake manifold 9*d*.

On the other hand, a first cooling passage, which is indicated by broken lined arrows, is provided so that a flowing medium at high temperature, which is discharged from the engine 2, is introduced into the main radiator 7 through a connecting pipe 9*i*, then being introduced again to the engine 2 through connecting pipes 9*j* and 9*k* through a flow regulating valve 10.

In addition, a part of the flowing medium that is separated by the flow regulating valve 10 is introduced into the sub-radiator 8 through a connecting pipe 9*m* to be further cooled therein, then being introduced into the water cooled intercooler 4.

The flowing medium that is introduced into the water cooled intercooler 4 is heat-exchanged with the intake air passing through the water cooled intercooler 4, then being introduced into the EGR cooler 6 through a connecting pipe 9*o* so as to be heat-exchanged with the exhaust gas passing through the EGR cooler 6.

Then the flowing medium that is discharged from an outlet port of the EGR cooler 6 is returned to the engine 2 after it joins together with the flowing medium flowing through the connecting pipe 9*k* at the confluent portion "c" thereof.

Incidentally, the flowing medium flowing through the connecting pipe 9*k* and the flowing medium flowing through the connecting pipe 9*p* may be joined together in an interior of the engine 2.

A second cooling passage, which is indicated by alternate long and short dash lined arrows, is provided so that a part of the flowing medium cooled in the first cooling passage is introduced into the sub-radiator 8 so as to be further cooled therein, then being introduced again to the engine 2 through the water cooled intercooler 4 and the EGR cooler 6 in these order.

In addition, a not-shown pump is provided in the first cooling passage.

Incidentally, the temperature of the flowing medium in the first cooling passage is 80° C.-100° C., while the temperature of the flowing medium in the second cooling passage is 50° C.-60° C.

In a thus constructed EGR device 1, a part of the flowing medium that is cooled by the main radiator is introduced into the sub-radiator through the flow regulating valve 10 to be cooled therein, being able to cool the exhaust gas in the EGR cooler 6. Therefore, it decreases the burden acting on the main radiator 7 to achieve the cooling performance that corresponds to high outputs of the engines.

Accordingly, the temperature of the second cooling passage can be lower by not less than 30° C. compared to that in a case where the flowing medium is introduced into the sub-radiator before it is cooled by the main radiator. As a result, the exhaust gas in the EGR cooler 6 can be sufficiently cooled.

In addition, a part of the flowing medium in the fist cooling passage is introduced into the second cooling passage, so that it produces no waste at a low engine load.

Further, as described above, the temperature of the second cooling passage can be lower by not less than 30° C., compared to that of the conventional inventions, so that the intake air can be cooled by the flowing medium that is cooled by the sub-radiator 8 flowing through the water cooled intercooler 4. Therefore, the EGR device 1 can bear super temperature and high pressure due to the turbocharger 3. Incidentally, the flowing medium in the first cooling passage cannot be used because the intake air needs to be cooled down near 50° C.

Next, the flow control, of the first cooling passage side (the main radiator side) and the second cooling passage side (the sub-radiator side), executed by the flow regulating valve 10 will be described in detail.

In the flow control by the flow regulating valve 10, driving circumstances of the engine 2, where a vehicle speed is detected at common intervals for example, is detected at a certain intervals, and the flow control is executed according to the control logic shown in FIG. 2, where a base flow rate is set so that the flow amount of the first cooling passage side (the main radiator side): the flow amount of the second cooling passage side (the sub-radiator side) becomes to be 75:25.

Specifically, at a constant vehicle speed, the flow rate is set so that the flow amount of the first cooling passage side (the main radiator side): the flow amount of the second cooling passage side (the sub-radiator side) becomes to be 60:40, taking account that the nitrogen oxide (NOx) amount included in the exhaust gas is very large, a high EGR rate is necessary, the engine load is low and the engine heat amount is small.

At a slow acceleration and deceleration of the vehicle, the flow rate is set so that the flow amount of the first cooling passage side (the main radiator side): the flow amount of the second cooling passage side (the sub-radiator side) becomes to be 65:35, taking account rthat the NOx amount included in the exhaust gas is relatively large, the high EGR rate is necessary, the engine load is low and the engine heat amount is small.

At a medium acceleration of the vehicle, the flow rate is set so that the flow amount of the first cooling passage side (the main radiator side): the flow amount of the second cooling passage side (the sub-radiator side) becomes to be 75:25, taking account that the NOx amount included in the exhaust gas is relatively large, the high EGR rate is necessary, the engine load is relatively high and the engine heat amount is relatively large.

At a full acceleration of the vehicle, the flow rate is set so that the flow amount of the first cooling passage side (the main radiator side): the flow amount of the second cooling passage side (the sub-radiator side) becomes to be 90-95:5-10, taking account that the NOx amount included in the exhaust gas is small, the high EGR rate is unnecessary, the engine load is high and the engine heat amount is large.

In the first embodiment, although the main radiator 7 and the sub-radiator 8 are separately illustrated, as shown in FIG. 3, the inner spaces of tanks 20*a* and 20*b* of the radiator 20 are vertically divided into two parts by partition plates 20*c* and 20*d* so as to form core parts 20*e* and 20*f*, respectively. A communicating hole 30, which is shown in FIG. 4 and will be later described, is formed in the partition plate 20*d* of the tank 20*b* to communicate the core parts 20*e* and 20*f* with each other so that the flowing medium of the first cooling passage can flow into one of the core parts 20*e* and 20*f*, while the flowing medium of the second cooling passage can flow into the other thereof. Therefore, the radiator can be constructed in compact.

As shown in FIG. 4, the tank 20*b* of the radiator 20 is divided by the partition plate 20*d* that is formed with the communicating hole 30, so that a tank of the main radiator 7 and a tank of the sub-radiator 8 can be formed as one unit.

In the first embodiment, the flow regulating valve 10 employs, what is called, a piston type orifice valve. The flow regulating valve 10 is provided with a piston 32 and a hydraulic actuator 33. The piston 32 has an orifice 31 for obtaining a certain opening area relative to an area of the communicating hole 30 of the partition plate 20*d* and can open and close the orifice 31, and the hydraulic actuator 33 is connected with a rod 32*a* of the piston 32 to drive the piston 32 from an exterior of the tank 20*b*.

Herein, an opening configuration of the orifice 31 and a configuration of detailed portions of the piston 32 may be designed appropriately.

In addition, the actuator, which serves as a drive means, is not limited to the hydraulic one, and it may employ various type actuators such as electric motor driven ones and temperature sensing ones.

Accordingly, the flow regulating valve 10 can be improved in simplification of its structure, precise control, flow resistance and component reliability, compared to those of the conventional butterfly valves and the conventional gate type valves.

In addition, the main radiator 7 and the sub-radiator 8 are formed as one unit, so that the radiator becomes compact, thereby a space of an engine compartment being efficiently usable.

On the other hand, as shown in FIG. 5, the inner spaces of the tanks 20*a* and 20*b* of the radiator 20 are divided into two parts in a thickness direction of the tanks 20*a* and 20*b* by the partition plates 20*c* and 20*d* to form the core parts 20*e* and 20*f*, respectively, and the communicating hole 30 is formed in the partition plate 20*d* of the tank 20*b* so as to communicate the core parts 20*e* and 20*f* with each other so that the flowing medium of the first cooling passage can flow to the one of the core parts 20*e* and 20*f*, while the flowing medium of the second cooling passage can flow to the other thereof. Therefore, the radiator can be constructed in compact.

A piston type orifice valve shown in FIG. 6 can also obtain the effects that are similar to the valve shown in FIG. 4 and described above.

The parts in FIG. 6 that are similar to those in FIG. 4 are indicated by using the same reference numbers, and their explanations are omitted.

Next, the effects of the EGR device of the first embodiment will be described.

As described above, the EGR device 1 of the first embodiment includes the first cooling passage and the second cooling passage, where the first cooling passage introduces the flowing medium that is discharged from the engine 2 into the main radiator 7 so that the flowing medium is cooled therein and then it returns the flowing medium to the engine 2, while the second cooling passage introduces the part of the flowing medium, which is cooled in the first cooling passage, to the sub-radiator 8 so that the flowing medium is further cooled therein. Then the second cooling passage introduces the flowing medium to the EGR cooler 6, and introduces the flowing medium that is discharged from the EGR cooler 6 to the engine 2 again. Therefore, the EGR device can comply with the need for high cooling performance of the radiator (the main radiator 7 and the sub-radiator 8), cooling the exhaust gas flowing through the EGR cooler 6.

In addition, the EGR device 1 has the flow regulating valve 10, corresponding to a flow regulating means that regulates a flow amount of the flowing medium that is cooled in the first cooling passage and is introduced into the sub-radiator 8. Therefore, the optimum flow amount rate can be obtained between the first cooling passage and the second cooling passage according to the driving conditions of the engine.

Further, the main radiator 7 and the sub-radiator 8 are combined with each other to form the radiator 20 as the one unit, and the inner space of the tank 20*b* of the radiator 20 is separately divided by the partition plate 20*d* with the communicating hole 30 so as to form the tank of the main radiator 7 and the tank of the sub-tank 8. I addition, the flow regulating valve 10, corresponding to the flow regulating means, is the piston type orifice valve including the piston 32 that has the orifice 31 for obtaining the certain opening area relative to that of the communicating hole 30 of the partition plate 20*d* and can open and close the orifice 31, and the actuator 33 that drives the piston 32. Therefore, the flow regulating valve 10 can be improved in the simplification of its structure, the precise control, the flow resistance and the component reliability, compared to those of the conventional butterfly valves and the conventional gate type valves.

Further, the main radiator 7 and the sub-radiator 8 are formed as one unit, and accordingly the EGR device 1 can be constructed in compact, thereby the space in the engine compartment being efficiently usable.

Further, the part of the cooling medium that is cooled in the first cooling passage is introduced into the sub-radiator 8 so as to be further cooled, and then it is introduced to the water cooled intercooler 4 and the EGR cooler 6 in these order. Therefore, the EGR device 1 can bear the super high temperature and the high pressure due to the turbocharger 3.

While there have been particularly shown and described with reference to preferred embodiments thereof, it will be understood that various modifications may be made therein, and it is intended to cover in the appended claims all such modifications as fall within the true spirit and scope of the invention.

For example, the flow amount regulation of the flow regulating valve may be controlled in relation to an information value including an accelerator opening angle, an intake air amount of the air and an EGR rate.

The invention claimed is:

1. An EGR device comprising:
  a first cooling passage configured to introduce a flowing medium discharged from an engine into a main radiator so that the flowing medium is cooled therein and then the flowing medium returns to the engine;
  a second cooling passage configured to introduce a part of the flowing medium cooled in the first cooling passage to a sub-radiator so that the flowing medium is further cooled therein, the second cooling passage configured to introduce the flowing medium to an EGR cooler to return the flowing medium, which is discharged from the EGR cooler, to the engine; and
  a flow regulating means capable of regulating a flow amount of the flowing medium that is cooled in the first cooling passage so as to be introduced into the sub-radiator,
  wherein the main radiator and the sub-radiator are combined to form a radiator having a tank as one unit,
  wherein an inner space of the tank of the radiator is separately divided by a partition plate that is provided with a communicating hole therein to form the tank of the main radiator and the tank of the sub-radiator, and
  wherein the flow regulating means has a piston type orifice valve including a piston having an orifice for obtaining a certain opening area relative to an area of the communicating hole of the partition plate, the piston being able to open and close the orifice, and a driving means that drives the piston.

2. The EGR valve according to claim 1, wherein the flow regulating means is for controlling an increase in a ratio of a first cooling passage side flow amount to a second cooling passage side flow amount as an engine load becomes larger.

3. The EGR valve according to claim 1, further comprising:
  a water cooled intercooler associated with the second cooling passage,
  wherein a part of the flowing medium that is cooled in the first cooling passage is introduced into the sub-radiator so as to be further cooled, then introduced to the water cooled intercooler and the EGR cooler in order thereof.

4. The EGR valve according to claim 3, wherein the flow regulating means is for controlling an increase in a ratio of a first cooling passage side flow amount to a second cooling passage side flow amount as an engine load becomes larger.

* * * * *